United States Patent
Nakamura et al.

(10) Patent No.: US 6,629,623 B2
(45) Date of Patent: Oct. 7, 2003

(54) WIDE-MOUTH CONTAINER MADE OF SYNTHETIC RESIN AND METHOD OF MANUFACTURING PRESSURE WIDE-MOUTH CONTAINER

(75) Inventors: Yoshinobu Nakamura, Hyogo (JP); Koichi Fujisawa, Hyogo (JP); Masamichi Tawara, Hiroshima-ken (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 46 days.

(21) Appl. No.: 10/142,781

(22) Filed: May 13, 2002

(65) Prior Publication Data

US 2002/0125259 A1 Sep. 12, 2002

Related U.S. Application Data

(62) Division of application No. 09/392,287, filed on Sep. 8, 1999, now Pat. No. 6,422,414.

(30) Foreign Application Priority Data

Sep. 25, 1998 (JP) .............................................. 10-272360

(51) Int. Cl.[7] .............................................. B65D 23/00
(52) U.S. Cl. .................... 220/669; 220/675; 206/315.9; 215/382
(58) Field of Search .................. 220/669, 675; 206/315.9; 215/43, 382

(56) References Cited

U.S. PATENT DOCUMENTS

| 4,124,117 A | * | 11/1978 | Rudy .................. 206/315.9 X |
| 4,671,406 A | * | 6/1987 | Baer ...................... 20/315.9 X |
| 5,126,177 A | | 6/1992 | Stenger |
| 5,342,663 A | * | 8/1994 | Yokobayashi ............. 215/43 X |
| 5,507,998 A | | 4/1996 | Yokobayashi |
| 5,848,690 A | * | 12/1998 | Granger et al. .......... 206/315.9 |
| 5,989,661 A | | 11/1999 | Krishna Kumar et al. |
| 6,112,925 A | | 9/2000 | Nahill et al. |
| 6,422,414 B1 | * | 7/2002 | Nakamura et al. .......... 220/669 |

FOREIGN PATENT DOCUMENTS

| JP | 4154535 | 5/1992 |
| JP | 4177992 | 7/1992 |
| JP | 53032248 | 2/1993 |
| JP | 7242222 | 9/1995 |
| JP | 7256738 | 10/1995 |

* cited by examiner

Primary Examiner—Steven Pollard
(74) Attorney, Agent, or Firm—Birch, Stewart, Kolasch & Birch, LLP

(57) ABSTRACT

A pressure wide-mouth container made of synthetic resin and having a cylindrical body portion, a flange portion projecting from the periphery of a wide mouth formed at one end of the body portion; and a bottom portion closing the other end of the body portion. The flange portion and a peripheral portion of the wide mouth are formed by injection molding and not drawn after the injection molding is carried out. The body portion except the peripheral portion of the wide mouth and the bottom portion are formed by the injection molding and drawn by a blow molding to be performed after the injection molding is carried out and the bottom portion is drawn at a lower drawing ratio than the body portion.

4 Claims, 7 Drawing Sheets

(A)

(B)

WIDE-MOUTH CONTAINER MADE OF SYNTHETIC RESIN AND METHOD OF MANUFACTURING PRESSURE WIDE-MOUTH CONTAINER

This application is a divisional of application Ser. No. 09/392,287, filed on Sep. 8, 1999, now U.S. Pat. No. 6,422,414 the entire contents of which are hereby incorporated by reference and for which priority is claimed under 35 U.S.C. §120; and this application claims priority of Application No. 10-272360 filed in Japan on Sep. 25, 1998 under 35 U.S.C. §119.

BACKGROUND OF THE INVENTION

1. Field of the Invention

A present invention relates to a pressure wide-mouth container made of a synthetic resin and a method of manufacturing the pressure wide-mouth container. More particularly, the present invention relates to a container which is used to store tennis balls under pressure. To seal the container, a flange portion is projected from the periphery of a wide mouth of the container having a diameter almost equal to that of the cylindrical body portion thereof. A lid made of metal is tightened against a flange portion, with the lid doubly covering the flange portion.

2. Description of the Related Art

As a container containing an object such as tennis balls desired to be stored under pressure, a metal can made of a metal material has been used. In recent years, instead of the metal can, there is the wide use of a container made of a synthetic resin manufactured by blow-molding a synthetic resin such as polyethylene terephthalate or the like.

In using a container made of a synthetic resin, such as a pressure container for storing tennis balls or the like under pressure, similarly to the metal can, it is necessary to put the object in the container under pressure, close the container by tightening the metal lid against the flange portion projecting from the edge of the opening of the container, with the flange portion being doubly covered with the lid, and sealing the inside of the container under pressure.

A container made of the synthetic resin is much less expensive than a metal can in material cost. However, since a container made of a synthetic resin is produced by using a biaxial drawing and blow molding operation, it is difficult to provide the container with the flange portion which can meet the high strength requirement of withstanding the pressure to be applied thereto from the lid which is doubly tightened against the flange portion.

In order to solve the above-described problem, a container manufactured by the process shown in FIGS. 8A through 8D is proposed in Examined Japanese Patent Publication No. 6-22859. According to the container, as shown in FIG. 8A, there is formed by injection molding a parison 1 having a closed bottom surface 1a, an opening 1b at its top, and a cylindrical body portion 1c long and small in its diameter. Then, as shown in FIG. 8B, the parison 1 which is a molded product of a primary process is transferred to a blow molding die 2 to draw it in a biaxial direction (X and Y-directions) to obtain a molded product 3 of a secondary process, as shown in FIG. 8C. The semi-finished product 3 is cut along a line L to remove an umbrella-shaped part 1d formed at the upper end thereof. A container 4 shown in FIG. 8D is a final product.

The container 4 formed by blow molding has a cylindrical body portion 4a; a wide mouth 4b open at one end of the body portion 4a and having a diameter substantially equal to that of the body portion 4a; a flange portion 4c projecting radially from the periphery of the wide mouth 4b; and a bottom portion 4d formed at the other end of the body portion 4a. After tennis balls are put in the container 4 from the flange portion 4c, a lid 5 is tightened against the flange portion 4c, with the lid 5 doubly covering the flange portion 4c, as shown in FIG. 9 to seal the interior of the container 4. In this manner, tennis balls are stored in the container 4 under pressure.

In the method shown in FIG. 8, for manufacturing a container having the flange portion 4c against which the lid 5 is doubly tightened, the semi-finished (secondary) product 3 shown in FIG. 8C is formed by molding. Then, it is necessary to perform the additional process step of cutting off the unnecessary umbrella-shaped part 1d formed at the upper end of the body portion 4a. Thus, the method shown in FIG. 8 has comparatively many process steps.

In addition to the above-described problem, if the degree of the size accuracy of he flange portion 4c is low, a gap is generated between the flange portion 4c and the lid 5 which is doubly tightened against the flange portion 4c. Thus, the container 4 has a low degree of sealing performance. To prevent this, it is necessary to allow the flange portion 4c to have a high degree of size accuracy in the cutting operation. To this end, it is necessary to use a particular cutting tool having a high degree of cutting accuracy such as a ring-shaped cutter and perform the cutting step at high accuracy. Consequently,the method shown in FIG. 8 causes the manufacturing cost to be high and the manufacturing time to be extended.

Moreover, to form the flange portion 4c with a high size accuracy, it is necessary to minimize the variation of the thickness thereof. However, to allow the thickness thereof to be uniform in the biaxial drawing and blow molding operations, stability in the molding technique and molding condition and the operation stability of the molding machine are demanded. However, it is not always easy to keep these factors stable. In particular, the flange portion 4c requires a thickness of less than 1 mm. Thus, defective products are likely to be produced in the blow molding process. Actually, many defective articles are produced.

Furthermore, in the process of the formation of the flange portion 4c, the umbrella-shaped portion 1d formed at the upper end of the body portion 4a is cut off and discarded. That is, a part of the material is wasted. It is conceivable that the umbrella-shaped portion 1d can be recycled by mixing it with a resinous material. However, in this case, it is necessary to pulverize the umbrella-shaped portion id before mixing it with the resinous material with a pulverizing machine. Further, there is a limitation in the mixing percentage in consideration of the stability in the molding of the mixed materials. Thus, it is difficult to recycle the umbrella-shaped portion 1d.

Furthermore, when the container is used to accommodate tennis balls, the container is exposed to a high temperature atmosphere of the trunk of a vehicle or the like for a long time. Because the flange portion 4c is thinly formed by blow molding, it can become deformed by heat. As a result, gaps can be formed between the flange portion 4c and the lid 5 permitting air to leak out from the interior of the container 4. Thus, it is impossible to hold the interior of the container under pressure and hence hold the tennis balls therein at a predetermined internal pressure.

SUMMARY OF THE INVENTION

The present invention has been made in view of the above-described problem. Thus, it is an object of the present invention to provide a pressure wide-mouth container made of a synthetic resin and material and having a flange portion against which a lid is tightened, with the lid doubly covering the flange portion and which has a precise dimensional accuracy and a high degree of strength to seal the interior of he container under pressure.

It is another object of the present invention to manufacture a container in a minimum number of process steps and without generating waste.

In order to achieve this object, there is provided a pressure wide-mouth container made of a synthetic resin and having a cylindrical body portion, a flange portion projecting from the-periphery of the wide mouth formed at one end of the body portion; and a bottom portion closing the other end of the body portion. Advantageously, the flange portion and a peripheral portion of the wide mouth are formed by injection molding and not drawn after the injection molding is carried out. The body portion except for the peripheral portion of the wide mouth and the bottom portion are formed by injection molding and drawn by blow molding to be performed after the injection molding is carried out. The bottom portion is drawn at a lower drawing ratio than the body portion.

As described above, the flange portion and the peripheral portion of the wide mouth continuous with the flange portion are formed by injection molding. In the conventional manufacturing method, it is necessary to cut off the upper end of a semi-finished product after blow molding is carried out as shown in FIG. 8, whereas the manufacturing method of the present invention makes it possible to eliminate the cutting process and the disposal problem. There is no variations n the thickness of the pressure wide-mouth container in the blow molding operation and no variations in the size thereof because no cutting step is performed. Because the pressure wide-mouth container is formed by using a mold, it is possible to hold the thickness of the flange portion or the like to a predetermined precise dimensional accuracy. Consequently, a gap is not generated between the flange portion and the lid which is doubly tightened against the flange portion. That is, it is possible to securely seal the interior of the container under pressure.

Further, the bottom portion is drawn at a lower drawing ratio than the body portion to make the thickness of the bottom portion larger than that of the body portion. Thus, when the internal pressure of the container is applied to the bottom portion, the bottom portion is not easily deformed.

The diameter of the wide mouth is substantially equal to that of the body portion. The thickness of the flange portion and that of the peripheral portion of the wide mouth are set to be larger than the thickness of the body portion to permit the strength of the flange portion and the peripheral portion of the wide mouth to be higher than that of the body portion so that the periphery of a lid made of metal can be doubly tightened against the flange portion.

In the conventional container formed by blow molding shown in FIG. 8, the flange portion is drawn to allow it to have a comparatively high rigidity so that the flange portion may withstand the pressure to be applied thereto from the lid which is doubly tightened against the flange portion. In the present invention, the flange portion is only formed by injection molding and thus is not drawn. Thus, the rigidity of the flange portion is not increased by the blow molding (drawing). Supposing that the thickness of the flange portion not drawn is equal to that of a drawn one, the flange portion not drawn is lower than the drawn flange portion in the strength for the pressure to be applied thereto from the lid which is doubly tightened against the flange portion.

Therefore, the thickness of the flange portion of the present invention, formed by injection molding and not drawn, is set to be larger by 30% to 50% than that of the flange portion formed by blow molding.

In the present invention, the thickness of the flange portion which is formed by injection molding and is not drawn is favorably 1–5 times and more favorably 1.5–3 times as large as that of the body portion formed by injection molding and blow molding (biaxial drawing). The thickness of the peripheral portion of the wide mouth continuous with the flange portion is larger than that of the flange portion and 5–8 times as large as that of the body portion formed by the injection molding and the drawing. More specifically, in case that the container is used to accommodate tennis balls, the thickness of the flange portion is set to 0.4 mm–0.8 mm, favorably, 0.4 mm–0.6 mm, and more favorably, 0.55 mm. The thickness of the peripheral portion of the wide mouth is set to 1.0 mm–1.5 mm. The thickness of the body portion formed by injection molding and the drawing is set to 0.2 mm–0.4 mm, and favorably, 0.2 mm–0.35 mm. The width (projection amount from the peripheral portion of the wide mouth) of the flange portion is 2–5 mm, favorably, 2–4 mm, and more favorably, 3 mm. The length of the body portion in its axial direction depends on the object to be accommodated in the container. When the container is used to house tennis balls, the length of the body portion is set to contain 2–4 tennis balls. When the container contains four tennis balls, the length thereof is set to 265 mm.

The bottom portion has a flat plate-shaped hollow portion or a dome-shaped hollow portion formed in a center of the bottom portion and an erected ring portion formed on a periphery of the hollow portion. Otherwise, the bottom portion has a plurality of hollow portions formed circumferentially at certain intervals and a plurality of erected portions projecting from the intervals such that the shape of the bottom is petaloid. The bottom portion is so shaped that when an internal pressure is applied to the container, the hollow portion does not project beyond the erected ring portion to allow the container to maintain a self-standing configuration.

As described above, the bottom portion is drawn at a lower drawing ratio than the body portion. Thus, the thickness of the bottom portion is larger than that of the body portion and thus the bottom portion has a higher strength than the body portion. Accordingly, when the internal pressure is applied to the bottom portion, the bottom portion is not easily deformed. Further, the bottom portion has the erected ring portion or the petaloid portion to allow the container to have a pressure-resistant construction, such that the shape of the bottom portion prevents the hollow portion from projecting outwardly. The shape allows the container to stand for itself.

The container is preferably formed of molded polyethylene terephthalate. The container may be formed of synthetic resin such as polyvinyl chloride.

The container is preferably used to contain a tennis ball having a predetermined internal pressure; with a lid made of metal covering a flange portion doubly, a periphery of a metal lid is doubly tightened against a flange portion of the container under pressure to seal the container and store the tennis ball in the container under pressure.

Further, in the present invention, there is provided a method of manufacturing a pressure wide-mouth container made of synthetic resin comprising the steps of forming a cylindrical parison by injection molding, with a bottom surface thereof closed, a top thereof formed as a wide mouth, and a flange portion projecting from a periphery of the wide mouth; and drawing portions of the parison, except for the flange portion and the peripheral portion of the wide mouth, by biaxial blow molding to form a body portion and a bottom portion such that the bottom portion is drawn at a lower drawing ratio than the body portion.

More specifically, the parison is formed by injection molding as a bottom surface-closed conic cylindrical semi-finished product having a wide mouth and a flange portion projecting outward from the peripheral portion of the wide mouth. The parison becomes smaller gradually in its diameter from the peripheral portion of the wide mouth toward the bottom portion. The parison is transferred to a biaxial blow mold in which the flange portion and the peripheral portion of the wide mouth are brought into close contact with the surface of a cavity to prevent them from being drawn. Pressurized air is blown into the parison from the wide mouth to draw the conic cylindrical parison in a biaxial direction (X and Y-directions). Consequently, the parison is expanded such that in the X-direction, the diameter of the body portion is expanded to a diameter approximately equal to that of the wide mouth and in the Y-direction, the height of the parison becomes a predetermined one. In the blow molding, the shape of bottom portion is as same as a shape of a surface of the cavity or that of a member inserted in the cavity.

In the method of the present invention, the flange portion and the peripheral portion of the wide mouth continuous with the flange portion are formed only by injection molding; and the body portion and the bottom portion are formed by the injection molding and the blow molding (drawing in biaxial direction). The method of the present invention eliminates the need for a cutting process required to form the flange portion, thus manufacturing the container in a smaller number of process steps. That is, the method allows the container to be manufactured at a high productivity and at a lower cost.

DETAILED DESCRIPTION OF THE PREFERRED EMBODIMENTS

Figure 1:
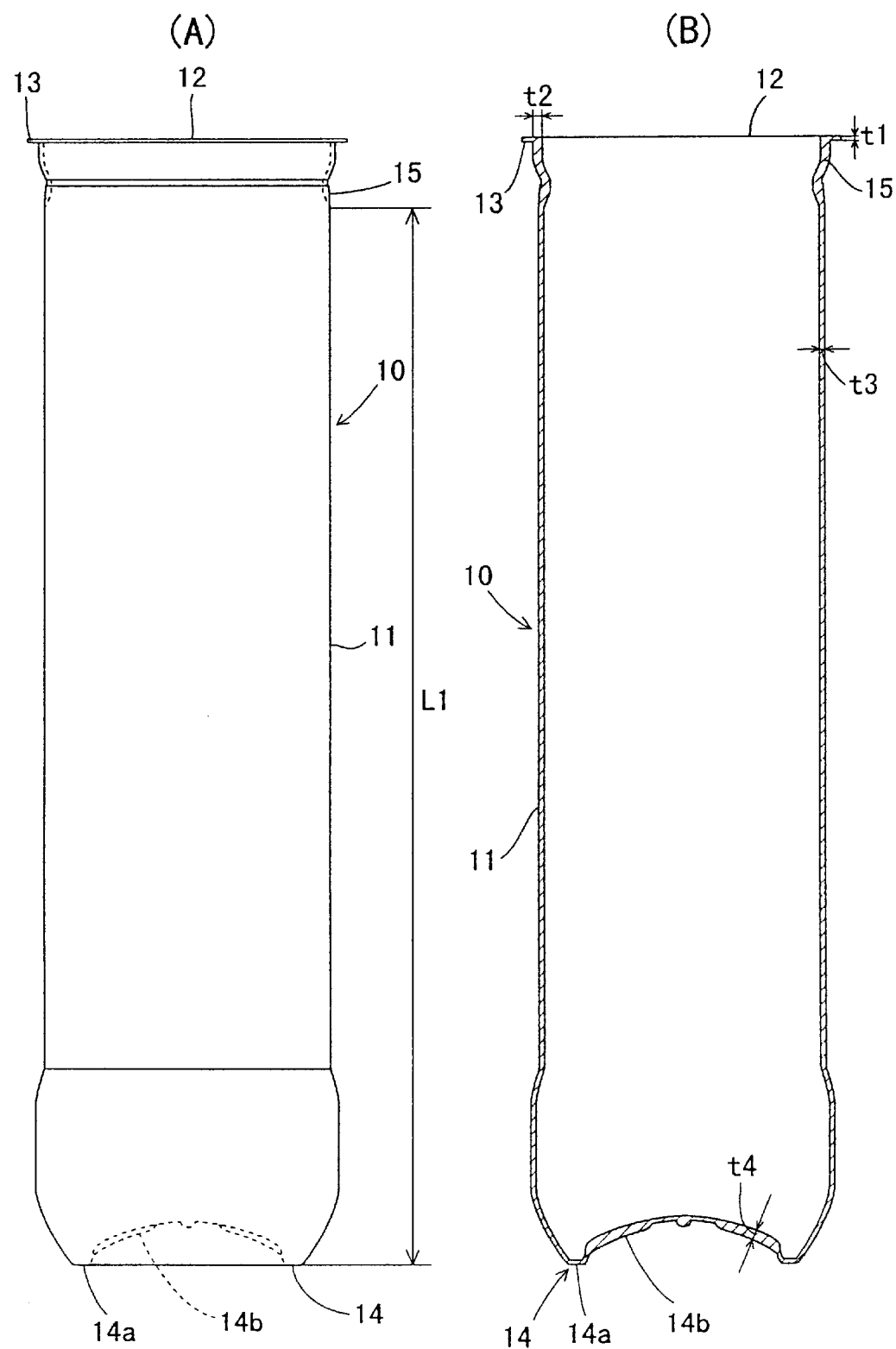
FIG. 1A is a front view showing a pressure wide-mouth container of the present invention.
FIG. 1B is a sectional view showing the pressure wide-mouth container of the present invention.

The embodiments of the present invention will be described below with reference to the drawings, wherein FIGS. 1A and 1B show a pressure wide mouth container 10 (hereinafter referred to as merely container) according to a first embodiment of the present invention. The container 10 is formed of polyethylene terephthalate by molding and accommodates tennis balls.

The container 10 has a cylindrical body portion 11; a flange portion 13 projecting radially from the periphery of a wide mouth 12 formed at one end of the body portion 11; and a bottom portion 14 closing the other end of the body portion 11. The diameter of the body portion 11 is substantially equal to that of the wide mouth 12.

The flange portion 13 and a peripheral portion 15 of the wide mouth 12, positioned at the upper end of the body portion 11, are formed in an injection molding process and are not drawn. The body portion 11 positioned below the peripheral portion 15 and the bottom portion 14 are formed by blow molding for biaxial drawing.

Figure 2:
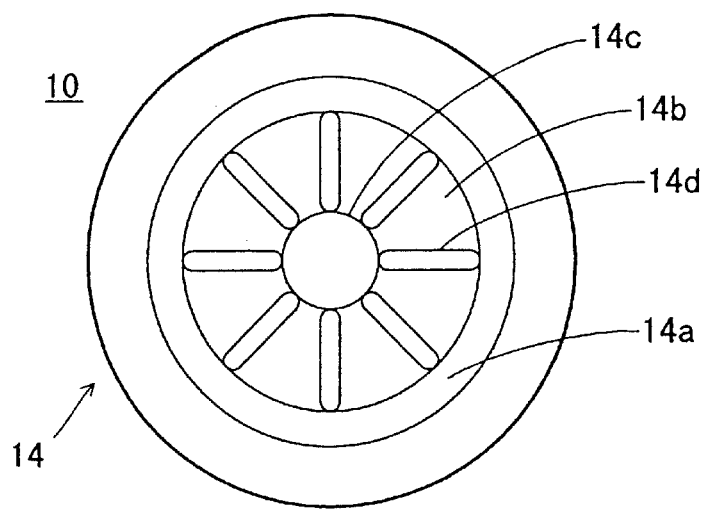
FIG. 2 is a bottom view showing the pressure wide-mouth container shown in FIG. 1.
Figure 3:
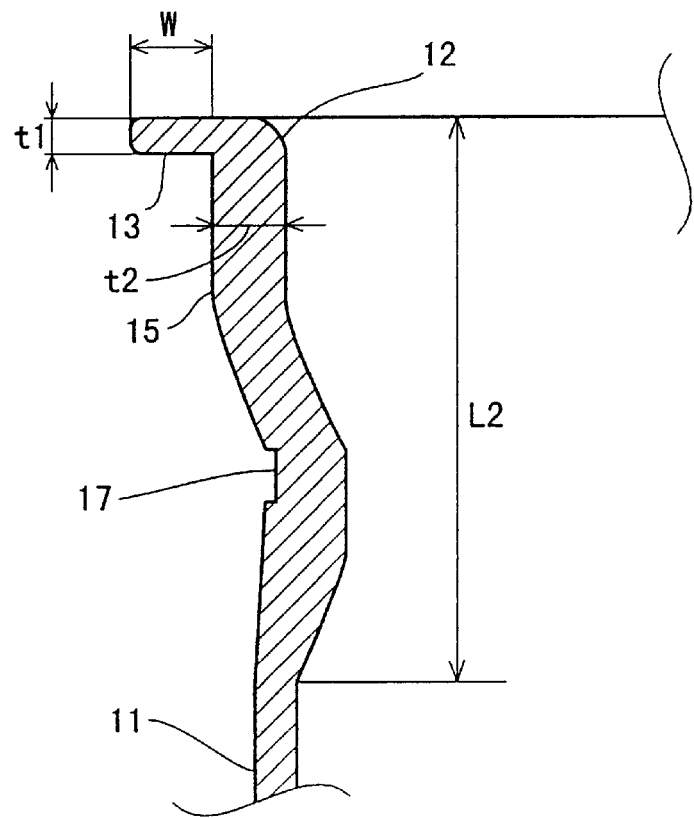
FIG. 3 is a main partial cross sectional view showing the pressure wide-mouth container.

The bottom portion 14 is drawn at a lower drawing ratio than the body portion 11. The bottom portion 14 has an erected ring portion 14a formed on the periphery thereof and a dome-shaped hollow portion 14b formed inside the erected ring portion 14a. As shown in FIG. 2, ribs 14d are formed radially at regular intervals in the domed hollow portion 14b between the peripheral side of the hollow portion 14b and a center portion 14c of the hollow portion 14b. The bottom portion 14 is so shaped that the hollow portion 14b is not deformed when an internal pressure is applied to the container 10 and that the hollow portion 14b does not project downward from the erected ring portion 14a even though the hollow portion 14b is deformed. Thus, the erected ring portion 14a holds the container 10 such that the container 10 can stand erect by itself.

Figure 4:
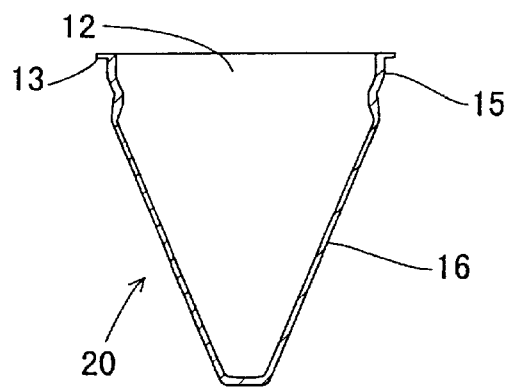
FIG. 4 is a cross sectional view showing a parison which is formed by molding which is performed in a process of manufacturing the pressure wide-mouth container.

In the method of manufacturing the container 10, initially, a primary mold product 20 called a parison shown in FIG. 4 is formed by injection molding. The parison is formed as cylinder 16 having a closed conical bottom surface, a wide mouth 12 and a flange portion 13 projecting outward from a peripheral portion 15 of the wide mouth 12.

The mold product 20 becomes smaller gradually in its diameter from the peripheral portion 15 toward the bottom portion 14. The mold product 20 is processed into the container 10, namely, a final product shown in FIG. 1 without changing the configuration of the flange portion 13 and that of the wide-mouth peripheral portion 15. That is, the mold product 20 is formed by injection molding such that the flange portion 13 has a thickness of t1 and a width of w, and the peripheral portion 15 has a thickness of t2 and a length of L2.

Figure 5:
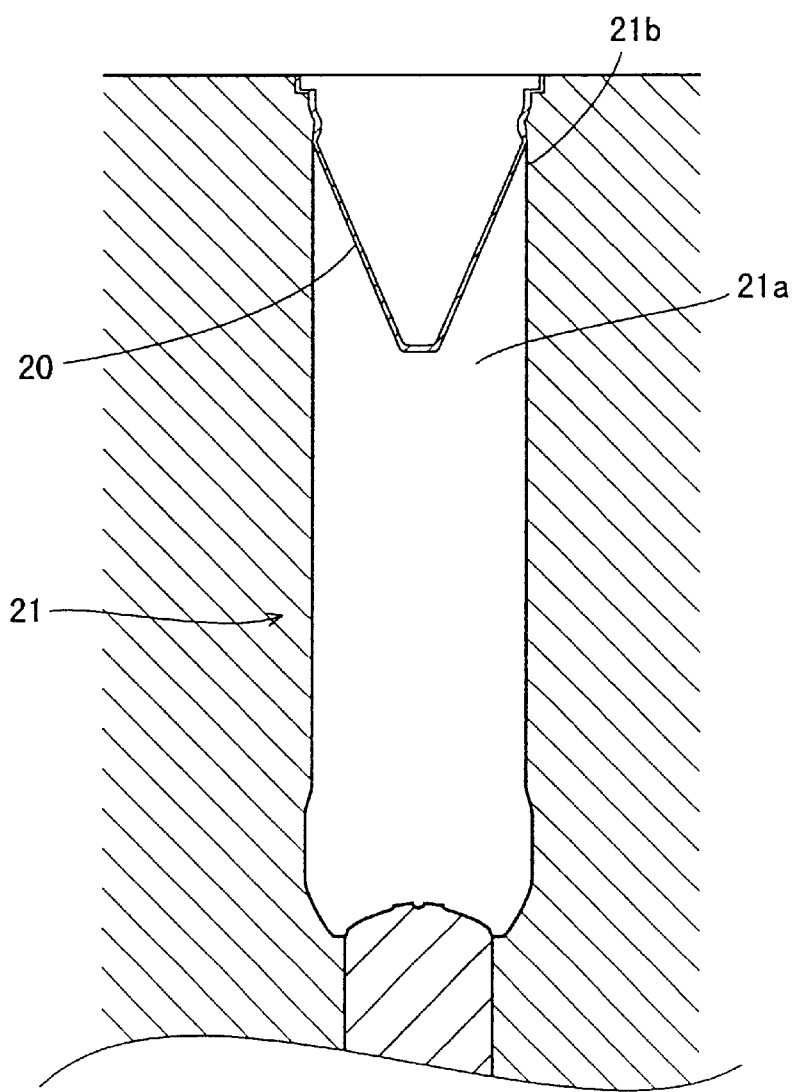
FIG. 5 is a cross sectional view showing a state in which the parison is accommodated in a blow mold.

As shown in FIG. 5, the mold product (parison) 20 is transferred to a biaxial blow mold 21. A gripping groove 17 recessed on the peripheral portion 15 is gripped by a chucking device (not shown in FIG. 5) to transfer the mold product 20 to the mold 21. In the mold 21, the flange portion 13 and the peripheral portion 15 of the wide mouth are brought into close contact with a surface 21b of cavity 21a of the mold 21 to prevent them from being subsequently drawn. The portion of the cylindrical semi-finished product 16 positioned below the peripheral portion 15 is hung in the cavity 21a by spacing from the surface 21b.

Then, blow molding is performed in combination with the operation of axially drawing the center portion of the conical cylinder 16 with a stroke rod called a drawing rod. The operation of pressing the bottom portion of the cylinder upwardly by a champagne portion of a member 22 inserted into the cavity, and an operation of blowing pressurized air in to the cylinder 16 from the wide mouth 12 such that the final product has optimum characteristics. Consequently, the conic cylinder 16 is drawn in a biaxial direction (X and Y-directions). More specifically, the conical cylinder 16 is expanded such that in the X-direction, the diameter of the body portion 11 is expanded to a diameter approximately equal to that of the wide mouth 12 and in the Y-direction, the height of the conical cylinder 16 becomes a predetermined one. That is, the body portion 11 having a predetermined diameter and height is formed along the surface 21b of the mold. In this process, the bottom portion positioned at the apex of the conic cylinder 16 is pressed upward by the champagne portion of the member 22 to form the champagne-shaped bottom portion 14. As described above, the bottom portion 14 has the erected ring portion 14a and the dome-shaped hollow portion 14b which is positioned inward from the erected ring portion 14a. After the blow molding is performed in this manner, the product is taken out of the mold 21 as the container 10 shown in FIG. 1.

In the container 10 manufactured in the primary process, namely, the injection molding process and the secondary process, namely, the blow molding process, the following relationship is established among the thickness t1 of the flange portion 13, the thickness t2 of the peripheral portion 15 of the wide mouth, the thickness t3 of the body portion 11, and the thickness t4 of the bottom portion 14:

$t4 > t2 > t1 > t3$

In the above equation, t1 is 1–5 times as large as t3; and t2 is 5–8 times as large as t3.

The thickness t1 of the flange portion 13 formed in the injection molding process is set to 0.4 mm–0.6 mm (in the embodiment, 0.55 mm). The thickness t2 of the peripheral portion 15 of the wide mouth is set to 1.0 mm–1.4 mm. The peripheral portion 15 has a maximum thickness, namely, 1.4 mm at the portion where the gripping groove 17 is formed. The thickness t4 of the drawn bottom portion 14 is set at 0.6 mm–2 mm. The thickness t3 of the drawn body portion 11 is set at 0.2 mm–0.4 mm.

The width w of the flange portion 13 is set at 4.0 mm. The length L2 of the thick peripheral portion 15 of the wide mouth, namely, from the upper end of the wide mouth 12 to its lower end is set at 17 mm. The entire length L1 of the body portion 11 including the length of the peripheral portion 15 is set to 265 mm to accommodate four tennis balls.

The flange portion 13 formed only by the injection molding is set at 0.4 mm–0.6 mm in the thickness t1 thereof and 3 mm in the width w thereof to allow the flange portion 13 to meet the high strength requirement of withstanding a pressure to be applied thereto from a lid 25 which is lightened against the flange portion 13, with the lid 25 doubly covering the flange portion 13. To allow the peripheral portion 15 of the wide mouth to have a high degree of strength for the same reason, the thickness t2 of the peripheral portion 15 is set to be larger than the thickness t3 of the body portion 11 which is drawn.

After tennis balls are put in the container 10, the interior thereof is pressurized, the wide mouth 12 is closed with the lid 25 made of aluminum, and the lid 25 is doubly tightened against the flange portion 13 to seal the interior of the container 10.

Figure 6:
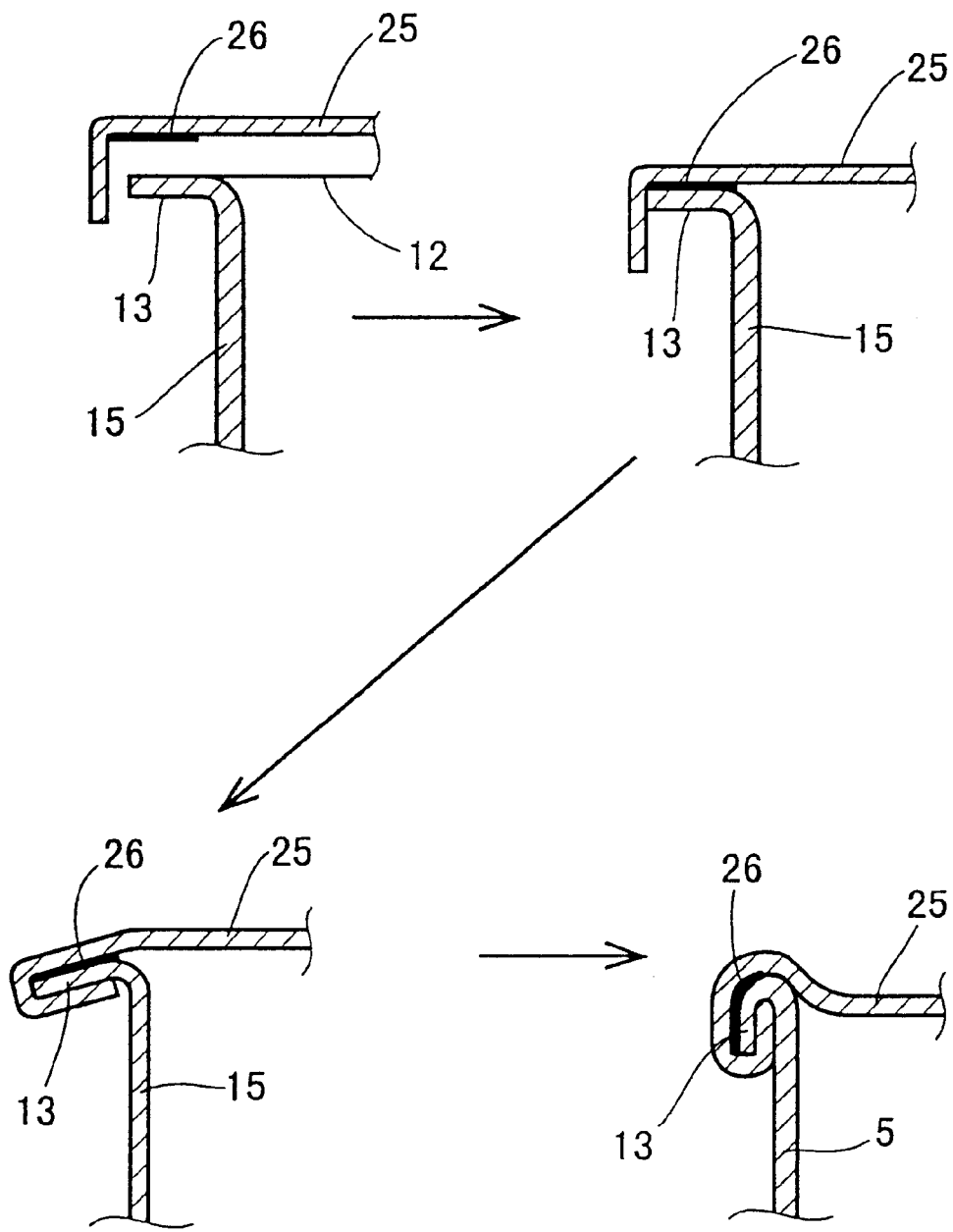
FIG. 6 is a cross schematic sectional view showing a process of installing a lid on the container.

By using a tightening device called a seamer, the lid 25 is tightened against the flange portion 13, with the lid 25 doubly covering the flange portion 13, while the interior of the chamber of the seamer is being pressurized, as shown in FIG. 6. In the tightening operation, a sealing agent 26 is applied to the back surface of the periphery of the lid 25 to increase the sealing performance between the lid 25 and the flange portion 13 which are tightened against each other.

The internal pressure of a tennis ball which is put in the container 10 is about 0.8 kgf/cm$^2$, whereas the internal pressure of the container 10 is 0.5–1.5 kgf/cm$^2$ to hold the internal pressure of the tennis ball put in the container 10.

Figure 7:
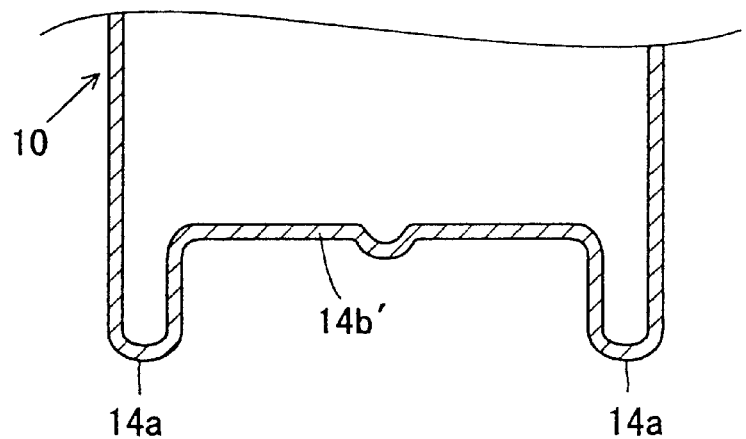
FIGS. 7A and 7B show a modification of a bottom portion of the container, respectively.
Figure 7:
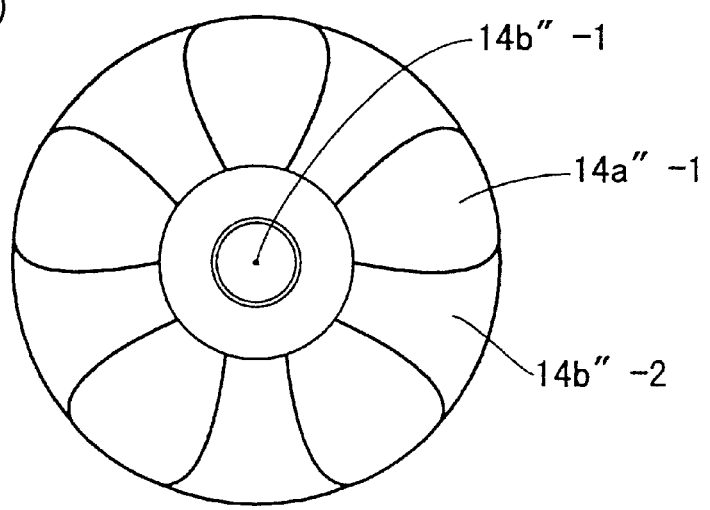
Figure 8:
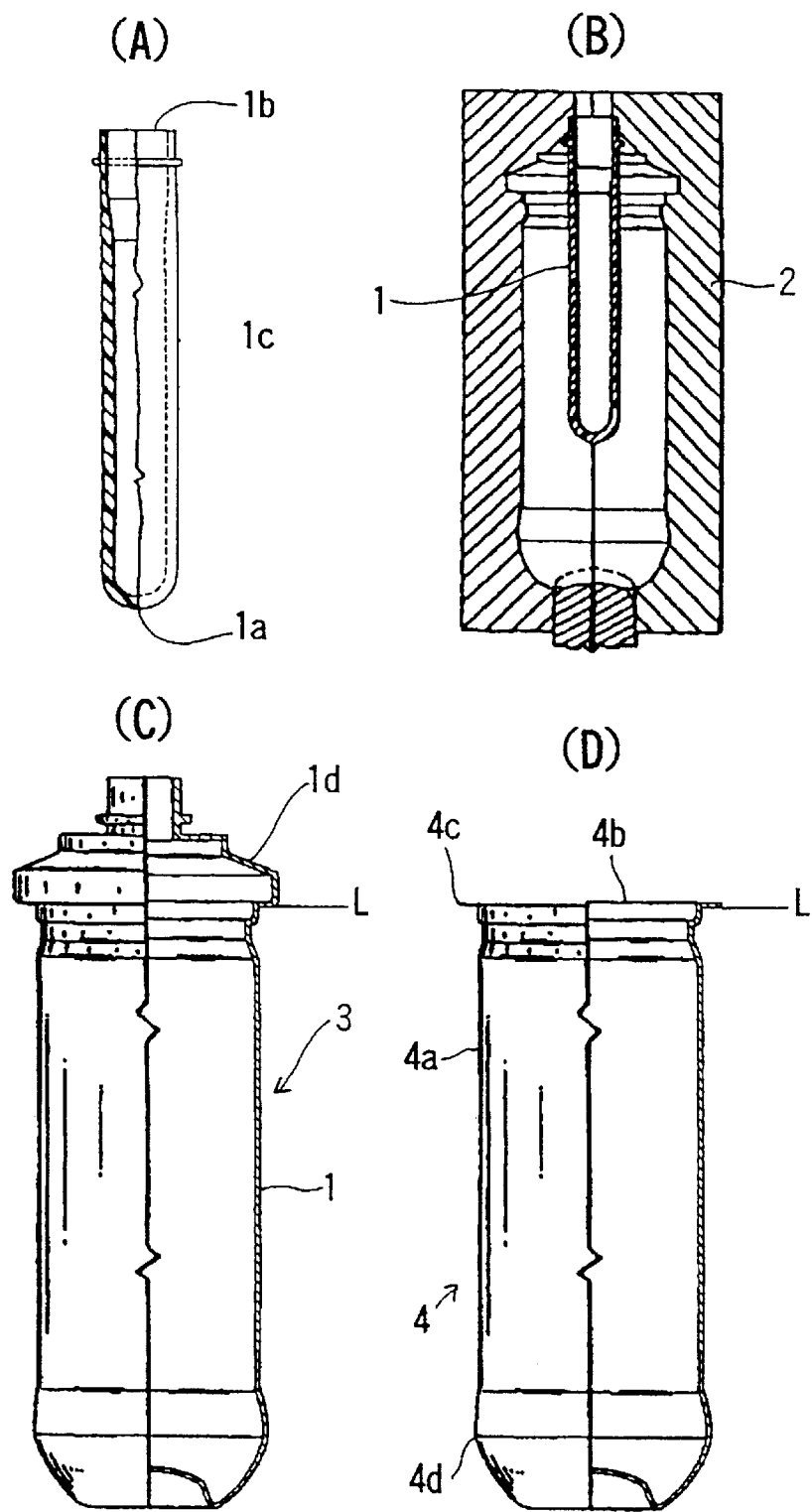
FIGS. 8A through 8D show a conventional method of manufacturing a container.
Figure 9:
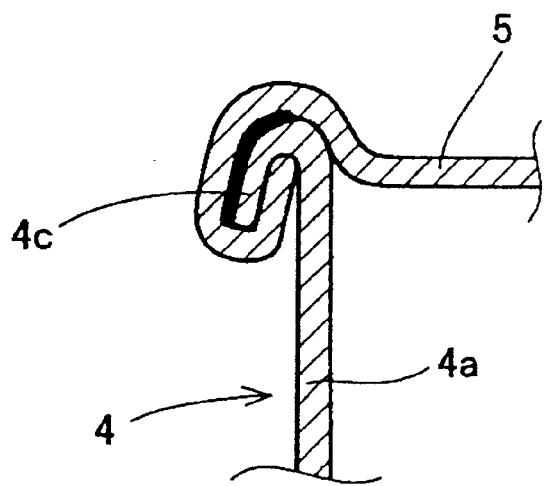
FIG. 9 is a sectional view showing a state in which a lid is doubly tightened against a flange portion.
Figure 10:
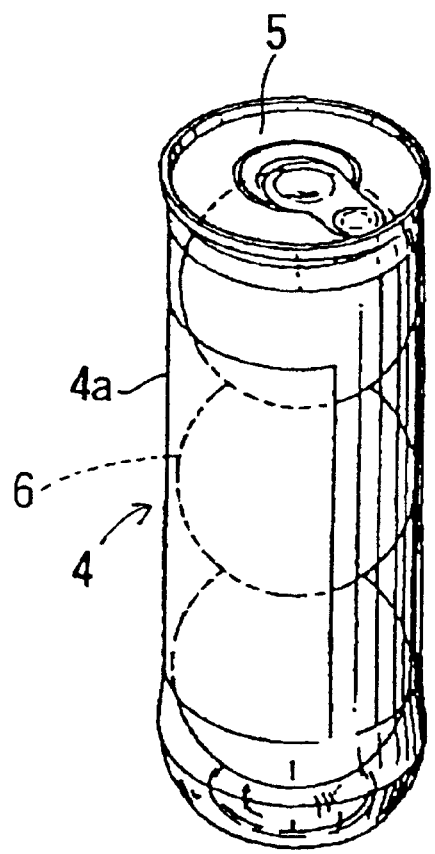
FIG. 10 is a perspective view showing a conventional tennis ball container.

The present invention is not limited to the embodiment. For example, the bottom portion 14 may be shaped as shown in FIGS. 7A and 7B. When an internal pressure is applied to the Container 10, the container 10 having the shapes shown in FIGS. 7A and 7B can stand for itself. That is, in FIG. 7A, a hollow portion 14b' surrounded with an erected ring portion 14a' is flat. The bottom portion 14 shown in FIG. 7B is petaloid-shaped. More specifically, the bottom portion 14 has a hollow portion 14b"-1 formed at the center thereof, a plurality of hollow portions 14b"-2 radially extending from the periphery of the bottom portion 14, and a plurality of erected portions 14a" alternating with the hollow portions 14b"-2.

The container of the embodiment is suitable for accommodating tennis balls. Needless to say, the container can be preferably used to accommodate other objects under pressure.

As described above, according to the present invention, the flange portion of the container against which the lid is doubly tightened, is formed by injection molding. Therefore, it is possible to manufacture the flange portion at precise dimensional accuracy. Thus, it is possible to keep the interior of the container under pressure, with no gap generated between the flange portion and the lid. In the conventional manufacturing method, an entire semi-finished product is blow-molded and then the upper end thereof is cut off to form the flange portion, whereas the manufacturing method of the present invention makes it possible to eliminate a cutting process and a waste disposal problem. Thus, the method of the present invention allows the container to be manufactured at a high productivity and at a lower cost.

Further, because the flange portion against which the lid is doubly tightened and the peripheral portion of the wide mouth continuous with the flange portion are formed thicker than the body portion which is formed by the injection molding and the blow molding, it is possible to prevent deformation of the flange portion and the peripheral portion of the wide mouth in a high-temperature atmosphere. Thus, it is possible to prevent the flange portion from deforming even in the case where the container containing tennis balls is preserved in a trunk of a vehicle or the like. That is, a gap is not generated between the flange portion and the lid and thus it is possible to prevent air from leaking out from the interior of the container.

What is claimed:

1. A wide mouth container made of synthetic resinous material, which comprising,
   a body portion,
   a bottom portion closing at one end of the body portion,
   a wide mouth opening of other end of the body portion,
   a flange portion projecting from a periphery of a wide mouth,
   wherein the flange portion and the periphery of the wide mouth are formed by injection molding but not drawn after said injection molding, and the bottom portion and the body portion except the peripheral portion of the wide mouth are formed by the injection molding and then drawn by blow molding after injection molding, the bottom portion, a thickness of the flange portion is 1.5–3 times as large as that of the body portion and the wide mouth is sealed by a lid.

2. A wide mouth container made of synthetic resinous material, which comprising,
a body portion,
a bottom portion closing at one end of the body portion,
a wide mouth opening of other end of the body portion,
a flange portion projecting from a periphery of a wide mouth,
wherein the flange portion and the periphery of the wide mouth are formed by injection molding but not drawn after said injection molding, and the bottom portion and the body portion except the peripheral portion of the wide mouth are formed by the injection molding and then drawn by blow molding after injection molding, the bottom portion being dawn at a lower drawing ratio than the body portion,
a thickness of the periphery portion of the wide mouth is larger than that of the flange portion, the thickness of the flange portion is larger than that of the body portion and the wide mouth is sealed by a lid.

3. A wide mouth container made of synthetic resinous material, which comprising,
a body portion,
a bottom portion closing at one end of the body portion,
a wide mouth opening of other end of the body portion,
a flange portion projecting from a periphery of a wide mouth,
wherein the flange portion and the periphery of the wide mouth are formed by injection molding but not drawn after said injection molding, and the bottom portion and the body portion except the peripheral portion of the wide mouth are formed by the injection molding and then drawn by blow molding after injection molding, the bottom portion being drawn at a lower drawing ratio than the body portion,
a thickness of the flange portion is 0.4 mm–0.8 mm, a thickness of the body portion is 0.2 mm–0.4 mm and the wide mouth is sealed by a lid.

4. A wide mouth container made of synthetic resinous material, which comprising,
a body portion,
a bottom portion closing at one end of the body portion,
a wide mouth opening of the other end of the body portion,
a flange portion projecting from a periphery of a wide mouth,
wherein the flange portion and the periphery of the wide mouth are formed by injection molding but now drawn after said injection molding, and the bottom portion and the body portion except the peripheral portion of the wide mouth are formed by the injection molding and then drawn by blow molding after injection molding, the bottom portion being drawn at a lower drawing ratio than the body portion, the wide mouth is sealed by a lid and a following relationship is established between a thickness of the flange portion and a thickness of the body portion; $0<$ the thickness of the flange portion/that of the body portion $\leqq 3$.

* * * * *